(12) United States Patent
Takagi et al.

(10) Patent No.: US 10,518,458 B2
(45) Date of Patent: Dec. 31, 2019

(54) SPINNING DIE FOR MELT-BLOWING

(71) Applicant: TOYOTA BOSHOKU KABUSHIKI KAISHA, Aichi-ken (JP)

(72) Inventors: Hirotaka Takagi, Toyota (JP); Koki Osugi, Komaki (JP); Takeshi Fujita, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 312 days.

(21) Appl. No.: 15/613,786

(22) Filed: Jun. 5, 2017

(65) Prior Publication Data
US 2017/0355123 A1 Dec. 14, 2017

(30) Foreign Application Priority Data

Jun. 9, 2016 (JP) .................................. 2016-115094

(51) Int. Cl.
*B29C 47/30* (2006.01)
*B29C 48/30* (2019.01)
(Continued)

(52) U.S. Cl.
CPC .............. *B29C 48/30* (2019.02); *B29C 48/08* (2019.02); *B29C 48/32* (2019.02); *B29C 48/345* (2019.02);
(Continued)

(58) Field of Classification Search
CPC ........ D01D 4/025; D01D 5/0985; D01D 5/14; D01D 5/084; D04H 1/565; D04H 1/56;
(Continued)

(56) References Cited

U.S. PATENT DOCUMENTS 3,707,593 A 12/1972 Shunsuke Fukuda et al.
3,954,361 A 5/1976 Page et al.
(Continued)

FOREIGN PATENT DOCUMENTS

JP 2012-180611 9/2012

OTHER PUBLICATIONS

Search Report issued in European Patent Office (EPO) Patent Application No. 17174166.3, dated Oct. 13, 2017.

*Primary Examiner* — Joseph S Del Sole
*Assistant Examiner* — Lawrence D. Hohenbrink, Jr.
(74) *Attorney, Agent, or Firm* — Greenblum & Bernstein, P.L.C.

(57) ABSTRACT

A spinning die for melt-blowing has plastic passages, a hot air passage, and an opening surface, in which discharge ports and blowing ports open. Adjacent and closest two of the discharge ports are first and second proximate discharge ports. One of the blowing ports corresponding to the first proximate discharge port is a first proximate blowing port, and one of the blowing ports corresponding to the second proximate discharge port is a second proximate blowing port. The first proximate blowing port includes a guide portion that projects away from the center of the first proximate discharge port. The guide portion is formed such that, as the distance from the opening surface increases, the hot air flow guided by the guide portion flows to be separated away from the hot air flow blown onto the molten plastic discharged from the second proximate discharge port.

9 Claims, 6 Drawing Sheets

(51) Int. Cl.
*B29C 48/345* (2019.01)
*B29C 48/08* (2019.01)
*B29C 48/32* (2019.01)
*B29C 48/86* (2019.01)
*D01D 5/084* (2006.01)
*D01D 5/14* (2006.01)
*D04H 1/724* (2012.01)
*D01D 4/02* (2006.01)
*D01D 5/098* (2006.01)
*D04H 1/56* (2006.01)
*B29L 31/14* (2006.01)
*B29L 31/00* (2006.01)
*B60H 3/06* (2006.01)

(52) U.S. Cl.
CPC ........... *B29C 48/865* (2019.02); *D01D 5/084* (2013.01); *D01D 5/14* (2013.01); *D04H 1/724* (2013.01); *B29L 2031/14* (2013.01); *B29L 2031/726* (2013.01); *B60H 3/06* (2013.01); *D01D 4/025* (2013.01); *D01D 5/0985* (2013.01); *D04H 1/56* (2013.01); *D04H 1/565* (2013.01)

(58) Field of Classification Search
CPC ................. D04H 1/724; B29L 2031/14; B29L 2031/726; B60H 3/06
USPC ................................................ 425/72.2, 83.1
See application file for complete search history.

(56) References Cited

U.S. PATENT DOCUMENTS

| | | | | |
|---|---|---|---|---|
| 5,160,746 A | * | 11/1992 | Dodge, II | D04H 1/56 156/167 |
| 6,524,521 B1 | * | 2/2003 | Kuroiwa | D04H 3/16 26/71 |
| 2012/0139153 A1 | * | 6/2012 | Oyamada | D01D 4/025 264/211.12 |

* cited by examiner

SPINNING DIE FOR MELT-BLOWING

BACKGROUND OF THE INVENTION

The present invention relates to a die that is employed in a device for manufacturing nonwoven fabric using a melt-blowing method to spin molten plastic.

Conventionally, nonwoven fabric manufactured by a melt-blowing method is used, for example, for filtering material of a cabin air filter for a vehicle.

As shown in FIG. 10, a device for manufacturing nonwoven fabric using a melt-blowing method includes a die 90 for spinning molten plastic 95, a conveyor 93, which is arranged below the die 90, and a roller 94. The conveyor 93 collects a spun fiber 96 and conveys the fiber 96. The roller 94 rolls the nonwoven fabric 97, which is collected by the conveyor 93 and thus formed into a band shape.

In the die 90, the molten plastic 95 that has been extruded from a non-illustrated extruder is discharged downward from a discharge port, which opens in the lower surface of the die 90, through a plastic passage 91. Hot air flow 98, which is supplied from a non-illustrated hot air flow generating device, is blown from blowing ports, which open in the lower surface, through hot air passages 92 formed on the opposite sides of the plastic passage 91. The hot air flow 98 blown from the blowing ports is blown onto the molten plastic 95, which is discharged from the discharge port. The molten plastic 95 is thus drawn into the form of fiber to decrease the diameter of the fiber 96.

In the die disclosed in Japanese Laid-Open Patent Publication No. 2012-180611, an annular blowing port is arranged around each of the discharge ports, which blow molten plastic. The molten plastic 95 is thus fully surrounded by hot air flow blown from the blowing port.

To increase the velocity of manufacturing nonwoven fabric in the step of manufacturing the nonwoven fabric 97 using the melt-blowing method, the conveying speed of the conveyor 93 must be increased. However, if the conveying speed of the conveyor 93 is increased, the weight per unit area of the nonwoven fabric 97 is decreased. To maintain the weight per unit area of the nonwoven fabric 97, the discharge amount of the molten plastic 95 must be increased. However, to increase the discharge amount of the molten plastic 95, the molten plastic 95 must be heated to increase flowability. This increases the diameter of the discharged molten plastic 95, thus increasing the diameter of the fiber 96. To prevent such increase of the fiber diameter, the flow amount of the hot air flow 98 for drawing the molten plastic 95 must be increased. However, if the flow amount of the hot air flow 98 is increased, turbulence in airflows in the vicinity of the fiber 96 is promoted. As a result, in the conventional die 90, as well as the die disclosed in Japanese Laid-Open Patent Publication No. 2012-180611, fusion among the fibers 96 is promoted while the fibers 96 move from the die 90 to the conveyor 93, as shown in FIG. 11. The fibers 96 thus tend to form bundles each formed by multiple fibers 96. This may lower the clogging performance of the nonwoven fabric 97, that is, may lower the total amount of dust collected before the nonwoven fabric 97 becomes clogged.

SUMMARY OF THE INVENTION

Accordingly, it is an objective of the present invention to provide a spinning die for melt-blowing capable of restraining fusion of fibers.

To achieve the foregoing objective and in accordance with one aspect of the present invention, a spinning die for melt-blowing is provided. The die is employed in a device for manufacturing a nonwoven fabric using a melt-blowing method and includes a plurality of plastic passages, a hot air passage, and an opening surface in which a plurality of discharge ports and a plurality of blowing ports open. Each of the discharge ports discharges molten plastic supplied through the corresponding one of the plastic passage, and each of the blowing ports is arranged in correspondence with one of the discharge ports and blows hot air flow supplied through the hot air passage. The die spins the molten plastic discharged from the discharge ports by blowing hot air flow blown from the blowing ports onto the molten plastic. Each of the blowing ports includes a main portion. Adjacent and closest two of the discharge ports are first and second proximate discharge ports. One of the blowing ports that corresponds to the first proximate discharge port is a first proximate blowing port. One of the blowing ports that corresponds to the second proximate discharge port is a second proximate blowing port. The first proximate blowing port includes a guide portion that is continuous with the main portion of the first proximate blowing port and projects away from a center of the first proximate discharge port to guide the hot air flow in a projecting direction of the guide portion. The guide portion is formed such that, as a distance from the opening surface increases, the hot air flow guided by the guide portion flows to be separated away from the hot air flow blown onto the molten plastic, which is discharged from the second proximate discharge port, through the main portion of the second proximate blowing port.

DETAILED DESCRIPTION OF THE PREFERRED EMBODIMENTS

One embodiment will now be described with reference to FIGS. 1 to 5B.

Figure 1:
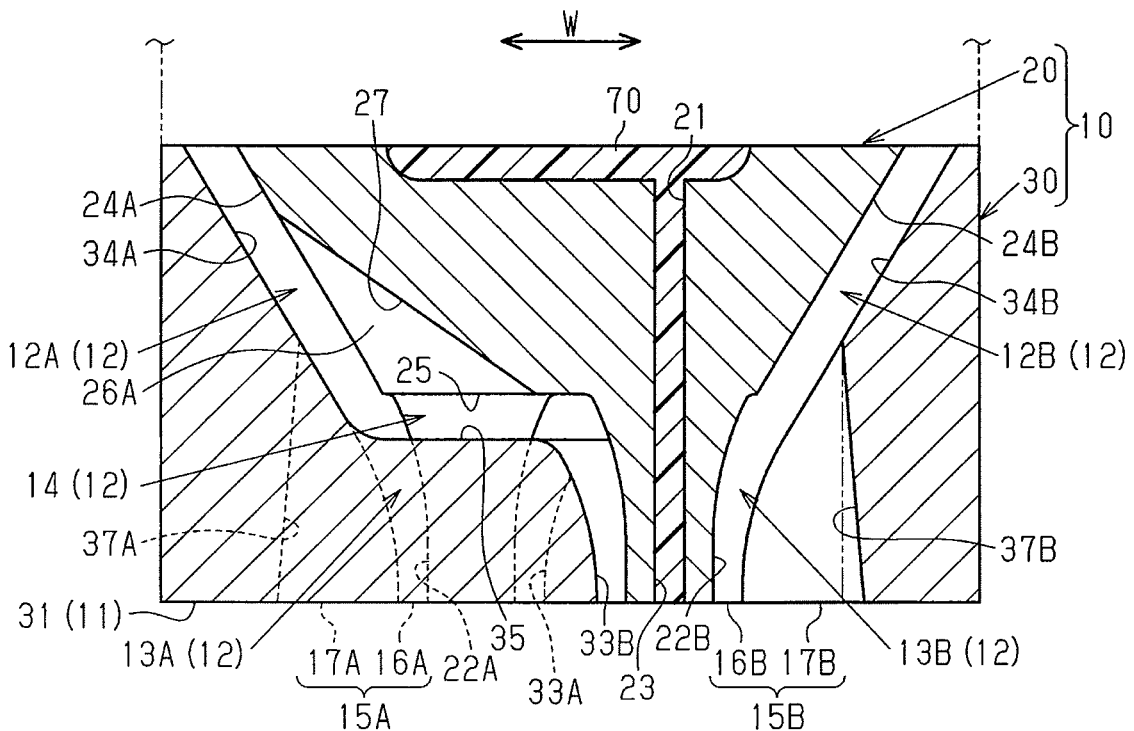
FIG. 1 is a cross-sectional view showing a spinning die for melt-blowing according to one embodiment.

As shown in FIG. 1, a spinning die for melt-blowing (hereinafter, referred to as a die 10) is employed in the aforementioned device for manufacturing nonwoven fabric using a melt-blowing method. The die 10 includes a nozzle member 20 and a lip member 30, which are opposed to each other in the vertical direction. The nozzle member 20 and the lip member 30 are both formed of metal such as stainless steel. In the description below, the lateral direction in FIG. 1 is referred to as the width direction W. The direction perpendicular to both the width direction W and the vertical direction, which is the direction perpendicular to the sheet surface of FIG. 1, is referred to as the longitudinal direction L.

<Nozzle Member 20>

Figure 3:
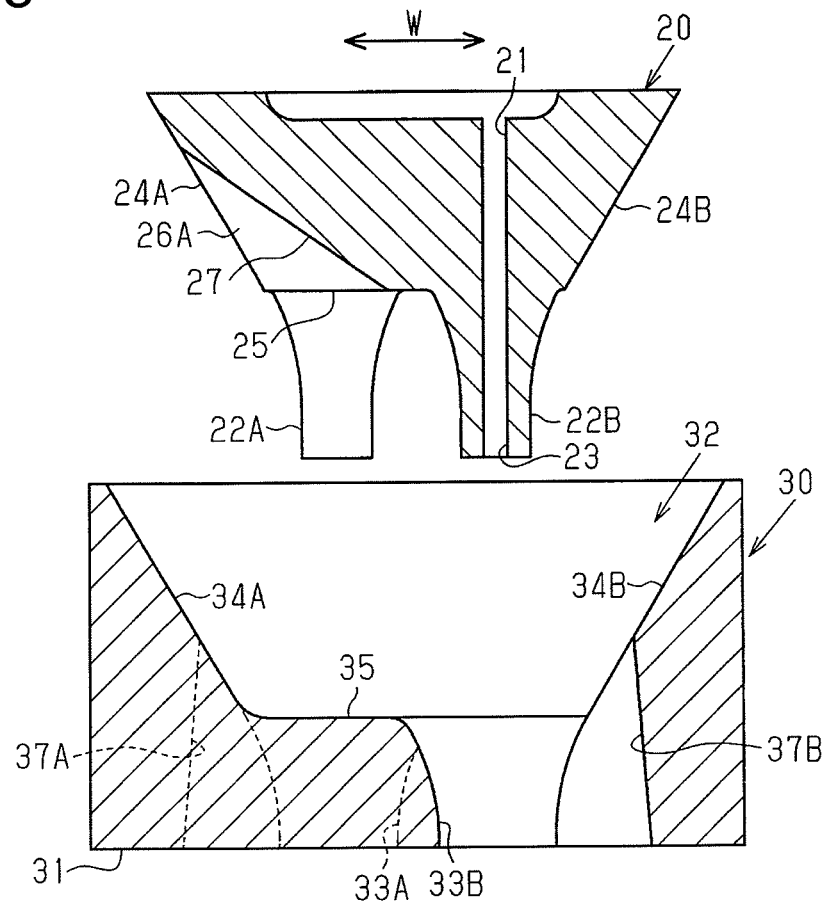
FIG. 3 is an exploded cross-sectional view showing a nozzle member and a lip member, which configure the die of the embodiment in a separated state.
Figure 4:
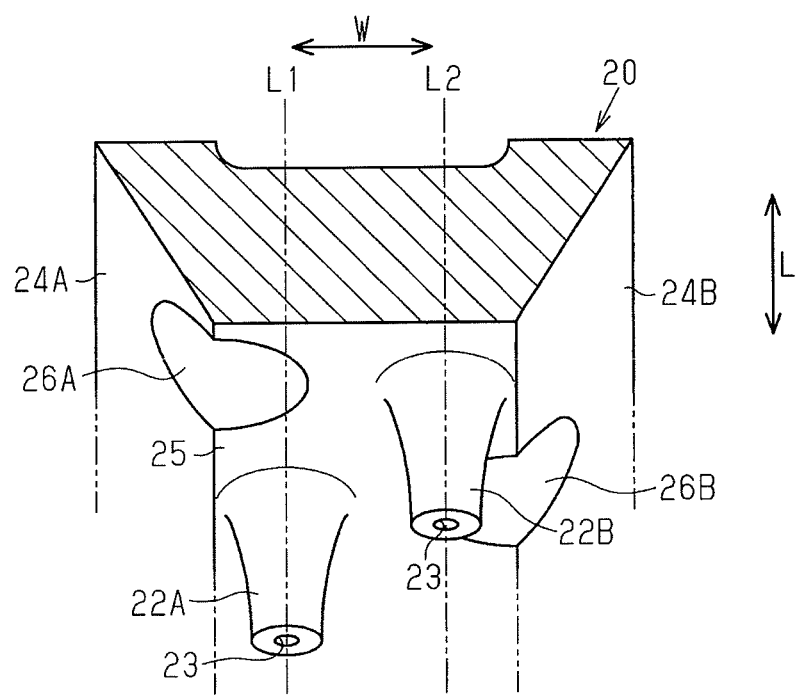
FIG. 4 is a perspective view showing the nozzle member of the embodiment as viewed from below.

As shown in FIGS. 3 and 4, the nozzle member 20 has a pair of first and second outer side surfaces 24A, 24B, which are located on the opposite sides in the width direction W and extend in the longitudinal direction L, and a flat portion 25, which are continuous with the first and second outer side surfaces 24A, 24B. The outer side surfaces 24A, 24B are both inclined inward in the width direction W toward the lower end. The flat portion 25 extends in both the width direction W and the longitudinal direction L.

As shown in FIG. 4, a first discharge portion 22A and a second discharge portion 22B, each of which substantially has a cylindrical shape, project respectively from the flat portion 25 on a first imaginary line L1 and a second imaginary line L2, which extend in the longitudinal direction L.

Each of the discharge portions 22A, 22B substantially has an inverted truncated conical shape. That is, the outer diameter of each discharge portion 22A, 22B decreases toward the lower end.

Although not illustrated, multiple first discharge portions 22A are formed and spaced apart at predetermined intervals on the first imaginary line L1. Also, multiple second discharge portions 22B are formed and spaced apart at predetermined intervals on the second imaginary line L2.

As shown in FIG. 3, the nozzle member 20 includes multiple plastic passages 21, each of which extends through the nozzle member 20 in the vertical direction along the center of the corresponding one of the discharge portions 22A, 22B. A discharge port 23, which discharges molten plastic 70, opens in a lower surface of each discharge portion 22A, 22B. As shown in FIG. 4, each discharge port 23 has a circular shape.

As shown in FIGS. 3 and 4, the nozzle member 20 includes first and second guide recesses 26A, 26B. The first guide recess 26A is formed to span the flat portion 25 and the first outer side surface 24A, which is more spaced from the discharge portion 22B than the second outer side surface 24B. The second guide recess 26B is formed to span the flat portion 25 and the second outer side surface 24B, which is more spaced from the discharge portion 22A than the first outer side surface 24A.

As shown in FIG. 3, a bottom surface 27 of the first guide recess 26A is inclined inward in the width direction W toward the lower end. The inclination angle of the bottom surface 27 of the first guide recess 26A with respect to the vertical direction is greater than the inclination angle of the first outer side surface 24A with respect to the vertical direction. The second guide recess 26B is shaped to be bilaterally symmetrical with the first guide recess 26A.

<Lip Member 30>

As shown in FIG. 3, a recess 32, which opens upward and extends in the longitudinal direction L, is formed in the lip member 30. A pair of first and second inner side surfaces 34A, 34B, which are inclined inward in the width direction W toward the lower end, are formed at the opposite sides of the recess 32 in the width direction W. The lower end of each of the inner side surfaces 34A, 34B is continuous with a bottom surface 35, which extends in both the width direction W and the longitudinal direction L.

Multiple first through-holes 33A and multiple second through-holes 33B, which extend through the lip member 30 in the vertical direction, are formed in the bottom surface 35 in correspondence with the respective first and second discharge portions 22A, 22B of the nozzle member 20. The inner diameter of each of the through-holes 33A, 33B decreases toward the lower end.

As represented by the solid line in FIG. 3, a second guide groove 37B is formed in an outer section of the inner peripheral surface of each of the second through-holes 33B in the width direction W. The upper end of each of the second guide grooves 37B opens in the second inner side surface 34B, which is on the right side. The lower end of each second guide groove 37B opens in a lower surface (hereinafter, referred to as an opening surface 31).

As represented by the broken line in FIG. 3, a first guide groove 37A is formed in an outer section of the inner peripheral surface of each of the first through-holes 33A in the width direction W. The upper end of each of the first guide grooves 37A opens in the first inner side surface 34A, which is on the left side. The lower end of each first guide groove 37A opens in the opening surface 31.

As shown in FIG. 1, the first discharge portions 22A and the second discharge portions 22B of the nozzle member 20 are each inserted in the corresponding one of the first through-holes 33A and the second through-holes 33B of the lip member 30.

In this state, each of the inner side surfaces 34A, 34B of the lip member 30 and the corresponding one of the outer side surfaces 24A, 24B of the nozzle member 20 are opposed to and spaced from each other. The bottom surface 35 of the lip member 30 and the flat portion 25 of the nozzle member 20 are opposed to and spaced from each other.

A pair of first and second inclined passages 12A, 12B is formed between the outer side surfaces 24A, 24B of the nozzle member 20 and the inner side surfaces 34A, 34B of the lip member 30. Each of the inclined passages 12A, 12B is inclined inward in the width direction W toward the lower end. That is, the first and second inclined passages 12A, 12B are inclined to approach each other toward the discharge ports 23 in the extending direction of each plastic passage 21.

A tubular passage 13B is formed between the outer peripheral surface of each second discharge portion 22B of the nozzle member 20 and the inner peripheral surface of the corresponding second through-hole 33B of the lip member 30. A tubular passage 13A is formed between the outer peripheral surface of each first discharge portion 22A of the nozzle member 20 and the inner peripheral surface of the corresponding first through-hole 33A of the lip member 30. The lower end of each of the tubular passages 13A, 13B opens in the lower surface of the die 10 (hereinafter, referred to as an opening surface 11).

A connecting passage 14, which connects the first inclined passage 12A on the left side to the tubular passage 13B on the right side, is formed between the flat portion 25 of the nozzle member 20 and the bottom surface 35 of the lip member 30.

Another connecting passage 14, which connects the second inclined passage 12B on the right side to the tubular passage 13A on the left side, is formed between the flat portion 25 of the nozzle member 20 and the bottom surface 35 of the lip member 30.

The first and second inclined passages 12A, 12B, the connection passages 14, and the tubular passages 13A, 13B form a hot air passage 12. The first and second inclined passages 12A, 12B are common to multiple blowing ports 15A, 15B of the hot air passage 12.

The lower end of the tubular passage 13B on the right side forms a main portion 16B of the corresponding blowing port 15B, which opens in the opening surface 11 of the die 10 and blows a hot air flow 80 supplied through the hot air passage 12.

The lower end of the tubular passage 13A on the left side forms a main portion 16A of the corresponding blowing port 15A, which opens in the opening surface 11 of the die 10 and blows the hot air flow 80 supplied through the hot air passage 12.

A lower end surface of each discharge portion 22A, 22B of the nozzle member 20 is flush with the opening surface 31 of the lip member 30.

Figure 2A:
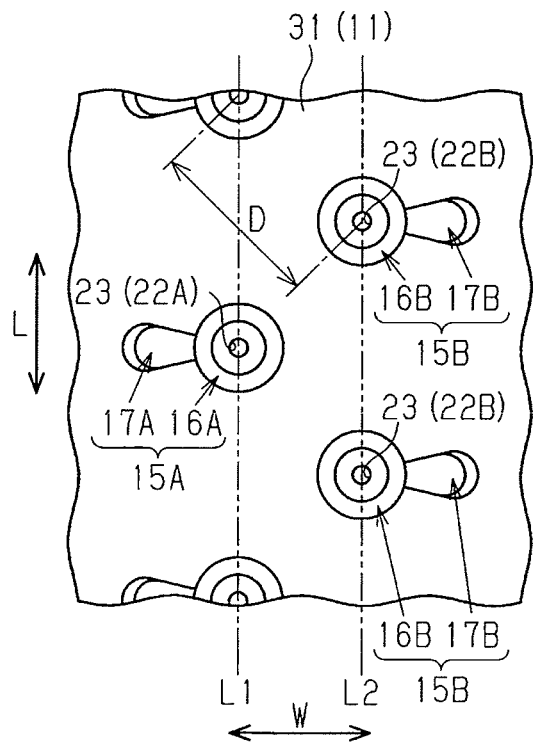
FIG. 2A is a front view showing the die of the embodiment as viewed from below.
Figure 2B:
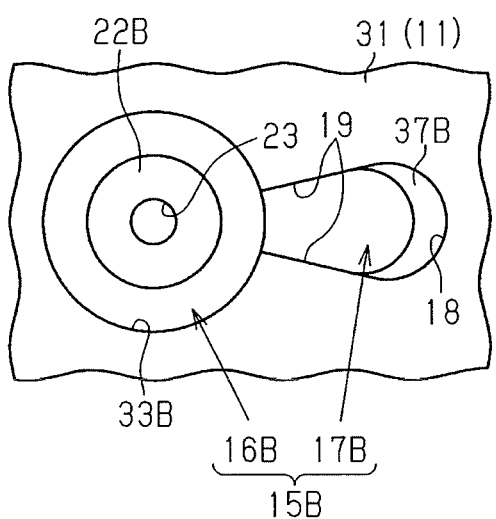
FIG. 2B is an enlarged front view showing a discharge port and a blowing port.

As shown in FIGS. 1, 2A, and 2B, the die 10 includes multiple discharge ports 23 and multiple blowing ports 15A, 15B. Each of the discharge ports 23 opens in the opening surface 11 and discharges the molten plastic 70 supplied through the corresponding one of the plastic passages 21. Each of the blowing ports 15A, 15B opens in the opening surface 11 and blows the hot air flow 80 supplied through the hot air passage 12.

As shown in FIG. 2A, the discharge ports 23 are formed alternately on the first imaginary line L1 and the second imaginary line L2. That is, the discharge portions 22A, 22B are formed such that the discharge port 23 of one of the discharge portions 22A (22B) is located between the discharge ports 23 of the corresponding adjacent two of the discharge portions 22B (22A) in the longitudinal direction L.

As shown in FIG. 2B, each blowing port 15B is defined by the inner peripheral edge of the lower end of the corresponding second through-hole 33B, the inner peripheral edge of the lower end of the guide groove 37B of the lip member 30, and the outer peripheral edge of the lower end of the second discharge portion 22B of the nozzle member 20. That is, the blowing port 15B is formed by an annular main portion 16B, which is concentric with the discharge port 23, and a guide portion 17B, which is formed to be continuous with the outer peripheral edge of the main portion 16B and projects outward in the width direction W.

The inner peripheral edge of each guide portion 17B has an arcuate portion 18 and a tapered portion 19, which is arranged between the arcuate portion 18 and the main portion 16B and has a dimension in the longitudinal direction L becoming smaller toward the main portion 16B. That is, the connecting portion between the main portion 16B and the guide portion 17B is constricted.

As shown in FIG. 1, the inclined passage 12B and the guide portion 17B of each blowing port 15B communicate with each other through the corresponding guide groove 37B. In relation to the vertical direction, the bottom surface of the guide groove 37B is inclined outward in the width direction W toward the lower end. The guide portion 17B, which has the inclined bottom surface, has a function of guiding the hot air flow 80 in the projecting direction of the guide portion 17B, or outward in the width direction W.

The blowing port 15A on the left side is shaped to be bilaterally symmetrical with the blowing port 15B on the right side. Description of the blowing port 15A on the left side is thus omitted herein.

As shown in FIG. 2A, the guide portions 17A, 17B of adjacent and closest two of the blowing ports 15A, 15B project in the opposite directions. That is, these two guide portions 17A, 17B are formed such that, as the distance from the opening surface 11 increases, hot air flows 82 guided by the guide portions 17A, 17B flow to be separated away from each other.

Figure 5A:
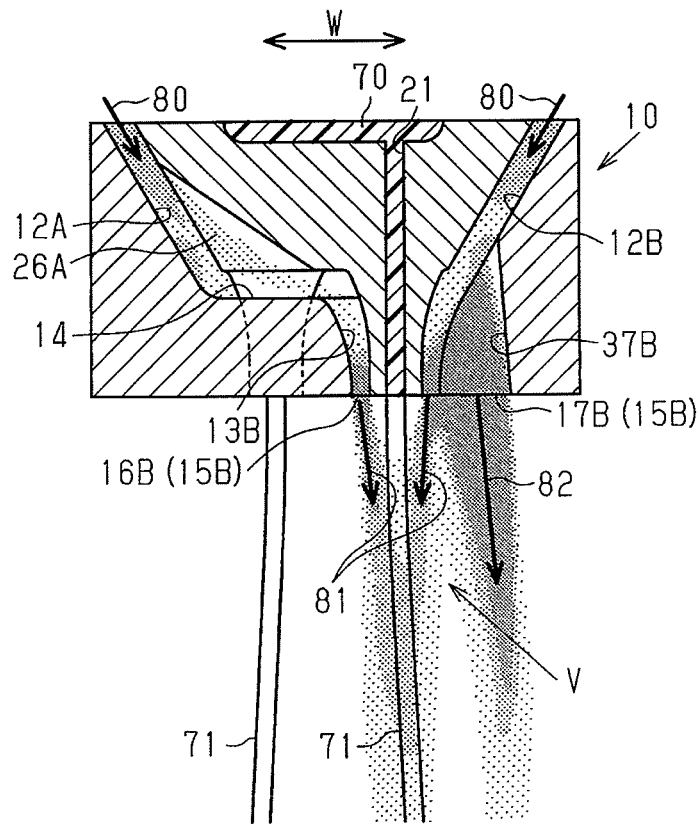
FIG. 5A is a cross-sectional view illustrating operation of the embodiment, showing the cross-sectional structure of the die at a position including a right-side discharge port, flow velocity distribution of hot air flows, and states of fibers.
Figure 5B:
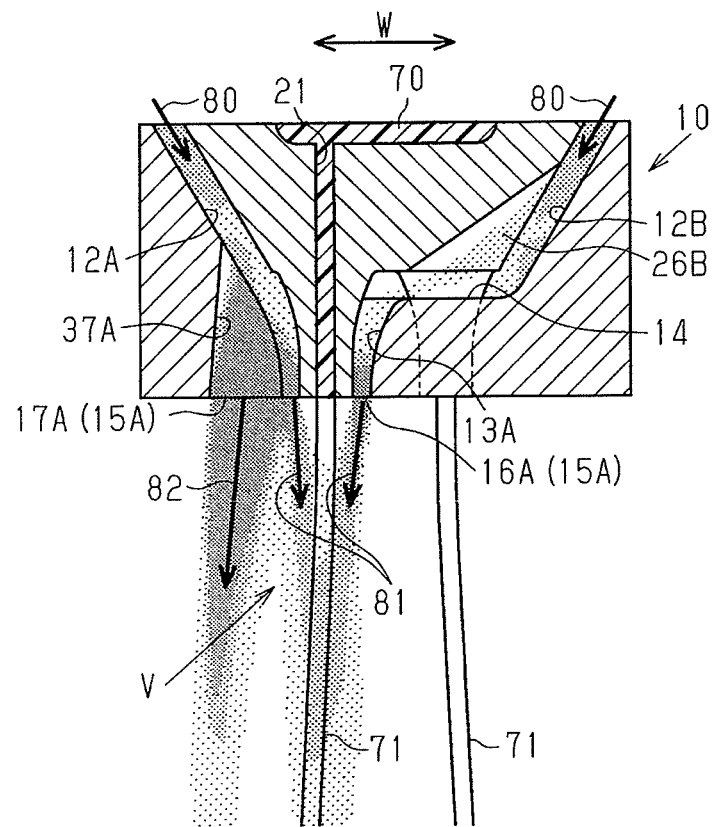
FIG. 5B is another cross-sectional view illustrating operation of the embodiment, showing the cross-sectional structure of the die at a position including a left-side discharge port, flow velocity distribution of hot air flows, and states of fibers.

The operation of the present embodiment will hereafter be described. In FIGS. 5A and 5B, distribution of the flow velocity of each hot air flow 80 to 82 is represented by dots. That is, the greater the dot density, the greater the flow velocity of the hot air flow 80 to 82.

As shown in FIG. 5A, the hot air flow 82 blown from the guide portion 17B of the blowing port 15B on the right side is guided in the projecting direction of the guide portion 17B (rightward). This produces a negative pressure zone V between the hot air flow 82 and the hot air flow 81 blown from the main portion 16B of the blowing port 15B. As a result, the molten plastic 70 discharged from the discharge port 23 on the right side is drawn into the form of fiber by the hot air flow 81 blown from the main portion 16B and drawn to the negative pressure zone V, which is produced on the right side with respect to a position immediately below the discharge port 23.

As shown in FIG. 5B, the hot air flow 82 blown from the guide portion 17A of the blowing port 15A on the left side is guided in the projecting direction of the guide portion 17A (leftward). This produces a negative pressure zone V between the hot air flow 82 and the hot air flow 81 blown from the main portion 16A of the blowing port 15A. As a result, the molten plastic 70 discharged from the discharge port 23 on the left side is drawn into the form of fiber by the hot air flow 81 blown from the main portion 16A and drawn to the negative pressure zone V, which is produced on the left side with respect to a position immediately below the discharge port 23.

As has been described, the hot air flows 82 guided by the two guide portions 17A, 17B flow to be separated away from each other as the distance from the opening surface 11 of the die 10 increases. The spun fibers 71 that have been discharged from the two adjacent and closest discharge ports 23 are thus unlikely to be located close to each other. This restrains fusion of the fibers 71.

The above-described spinning die for melt-blowing according to the present embodiment has the following advantages.

(1) Each blowing port 15A (15B) has the main portion 16A (16B) and the guide portion 17A (17B), which is formed in correspondence with the corresponding discharge port 23. In the blowing port 15A (15B), the guide portion 17A (17B) is continuous with the main portion 16A (16B) and projects in the direction separating from the center of the discharge port 23 to guide the hot air flow 80 in the projecting direction of the guide portion 17A (17B). The two guide portions 17A, 17B corresponding to adjacent and closest two of the discharge ports 23 are formed such that, as the distance from the opening surface 11 increases, the hot air flow 82 guided by the guide portion 17A and the hot air flow 82 guided by the guide portion 17B flow to be separated away from each other. Specifically, the adjacent and closest two of the discharge ports 23 will be referred to as first and second proximate discharge ports (23) and those of the blowing ports 15A, 15B corresponding to the first and second proximate discharge ports (23) will be referred to as first and second proximate blowing ports (15A, 15B). In this case, the first proximate blowing port (15A) has a first guide portion (the guide portion 17A) and the second proximate blowing port (15B) has a second guide portion (the guide portion 17B). The first and second guide portions (17A, 17B) are formed such that, as the distance from the opening surface 11 increases, the hot air flow 82 guided by the first guide portion (17A) and the hot air flow 82 guided by the second guide portion (17B) flow to be separated away from each other.

In this configuration, the operation of the above-described embodiment restrains fusion of the fibers 71.

(2) The guide portions 17A, 17B (the first and second guide portions) corresponding to adjacent and closest two of the discharge ports 23 (the first and second proximate discharge ports) project in the opposite directions.

In this configuration, as the distance from the opening surface 11 increases, the hot air flow 82 guided by the guide portion 17A (the first guide portion) and the hot air flow 82 guided by the guide portion 17B (the second guide portion) flow to be maximally separated away from each other in the width direction W. This adequately restrains approaching of the molten plastic 70 drawn by the hot air flow 81 blown from the main portion 16A and the molten plastic 70 drawn by the hot air flow 81 blown from the main portion 16B. Fusion of the fibers 71 is thus adequately restrained.

(3) The connecting portion between the main portion 16A (16B) and the guide portion 17A (17B) of each blowing port 15A (15B) is constricted.

This configuration facilitates separation between the hot air flow 81 blown from the main portion 16A (16B) and the hot air flow 82 guided by the guide portion 17A (17B). The negative pressure zone V is thus produced between the hot air flows 81, 82 with further reliability. This facilitates drawing of the molten plastic 70 discharged from each discharge port 23 into the corresponding negative pressure zone, thus effectively restraining fusion of the molten plastics 70 discharged from adjacent and closest two of the discharge ports 23.

(4) The main portion 16A (16B) of each blowing port 15A (15B) has an annular shape concentric with the corresponding discharge port 23. The guide portion 17A (17B) is formed to be continuous with the outer peripheral edge of the main portion 16A (16B). That is, the first guide portion (17A) is formed to be continuous with the outer peripheral edge of the main portion (16A) of the first proximate blowing port (15A) corresponding to the first proximate discharge port (23). The second guide portion (17B) is formed to be continuous with the outer peripheral edge of the main portion (16B) of the second proximate blowing port (15B) corresponding to the second proximate discharge port (23).

In this configuration, the molten plastic 70 discharged from each discharge port 23 is fully surrounded by the hot air flow 81 blown from the corresponding main portion 16A (16B). Also, the hot air flow 82 is guided by the corresponding guide portion 17A (17B), which is formed to be continuous with the outer peripheral edge of the associated main portion 16A (16B), in the projecting direction of the guide portion 17A (17B), or outward in the width direction W. The molten plastic 70 is thus accurately guided in the projecting direction of the guide portion 17A (17B).

(5) The discharge ports 23 are formed alternately on the first imaginary line L1 and the second imaginary line L2, which extend parallel to each other.

This configuration increases the distance D between adjacent and closest two of the discharge ports 23 without decreasing the total number of the discharge ports 23, which open in the opening surface 11 of the die 10. As a result, a sufficient weight per unit area of the fibers 71 of nonwoven fabric is ensured, compared to a configuration in which the discharge ports 23 are aligned and spaced apart in a single row.

(6) Each first guide groove 37A, which allows communication between the first inclined passage 12A and the guide portion 17A (the first guide portion) of the corresponding blowing port 15A (the first proximate blowing port), is formed in the inner peripheral surface of the corresponding through-hole 33A of the lip member 30. Each second guide groove 37B, which allows communication between the second inclined passage 12B and the guide portion 17B (the second guide portion) of the corresponding blowing port 15B (the second proximate blowing port), is formed in the inner peripheral surface of the corresponding through-hole 33B of the lip member 30.

In this configuration, the hot air flow 80 flowing in each of the inclined passages 12A, 12B is smoothly guided to the corresponding one of the guide portions 17A, 17B (the first and second guide portions). As a result, the hot air flow 80 supplied from the hot air passage 12 is reliably guided by the guide portion 17A in the projecting direction of the guide portion 17A. Also, the hot air flow 80 supplied from the hot air passage 12 is reliably guided by the guide portion 17B in the projecting direction of the guide portion 17B.

(7) The nozzle member 20 includes the first and second guide recesses 26A, 26B. Each first guide recess 26A is formed to span the first outer side surface 24A and the flat portion 25 and guides the hot air flow 80 supplied from the first inclined passage 12A toward the corresponding guide portion 17B (the corresponding second guide portion). Each second guide recess 26B is formed to span the second outer side surface 24B and the flat portion 25 and guides the hot air flow 80 supplied from the second inclined passage 12B toward the corresponding guide portion 17A (the corresponding first guide portion).

In this configuration, the hot air flow 80 flowing in the first inclined passage 12A is guided by each first guide recess 26A toward the corresponding guide portion 17B (the corresponding second guide portion). The hot air flow 80 flowing in the second inclined passage 12B is guided by each second guide recess 26B toward the corresponding guide portion 17A (the corresponding first guide portion). As a result, the hot air flow 80 blown from each blowing port 15A (each first proximate blowing port) is guided further effectively in the projecting direction of the corresponding guide portion 17A (the corresponding first guide portion) (outward in the width direction W). The hot air flow 80 blown from each blowing port 15B (each second proximate blowing port) is guided further effectively in the projecting direction of the corresponding guide portion 17B (the corresponding second guide portion) (outward in the width direction W). As a result, fusion of the spun fibers 71 discharged from adjacent and closest two of the discharge ports 23 (the first and second proximate discharge ports) is further effectively restrained.

<Modifications>

The above illustrated embodiments may be modified as follows.

The guide recesses 26A, 26B may be omitted.

Each guide groove 37A (37B) may be configured in any suitable manner as long as the guide groove 37A (37B) is formed in the inner peripheral surface of the corresponding through-hole 33A (33B) and opens in the opening surface 31 of the lip member 30. That is, the guide groove 37A, 37B does not necessarily have to open in the corresponding inner side surface 34A, 34B of the lip member 30.

Figure 6:
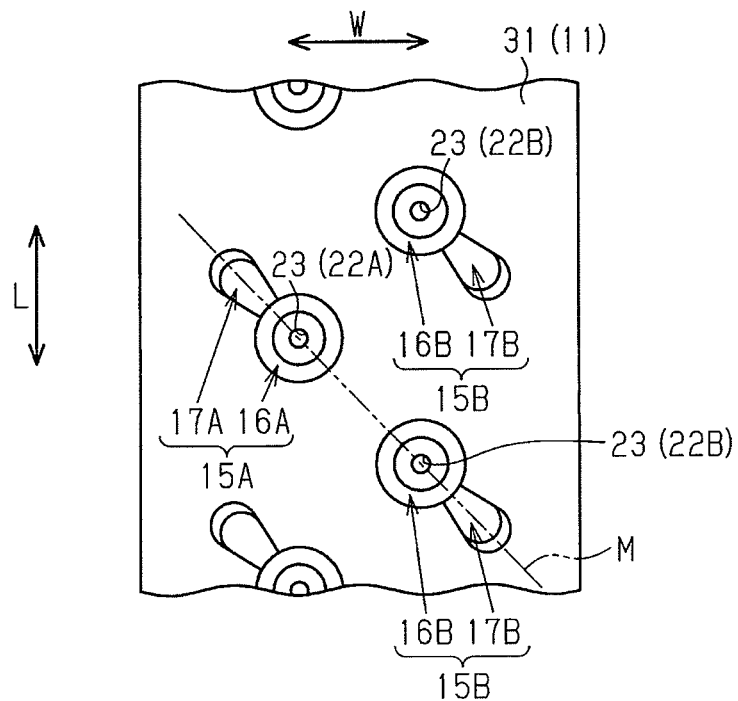
FIG. 6 is a front view showing a die of a modification as viewed from below.

For example, as shown in FIG. 6, the guide portions 17A, 17B (the first and second guide portions) may be formed to project on an imaginary line M, which connects the corresponding adjacent and closest two of the discharge ports 23 (the first and second proximate discharge ports) to each other. In this case, the hot air flow 82 guided by the guide portion 17A (the first guide portion) and the hot air flow 82 guided by the guide portion 17B (the second guide portion) flow to be maximally separated from each other in the direction along the imaginary line M as the distance from the opening surface 11 increases. This further restrains fusion of the fibers 71. Also, in this case, the projecting length of each guide portion 17A, 17B in the width direction W is decreased. This decreases the dimension of the opening surface 31 of the lip member 30 in the width direction W, thus reducing the die 10 in size.

Figure 7:
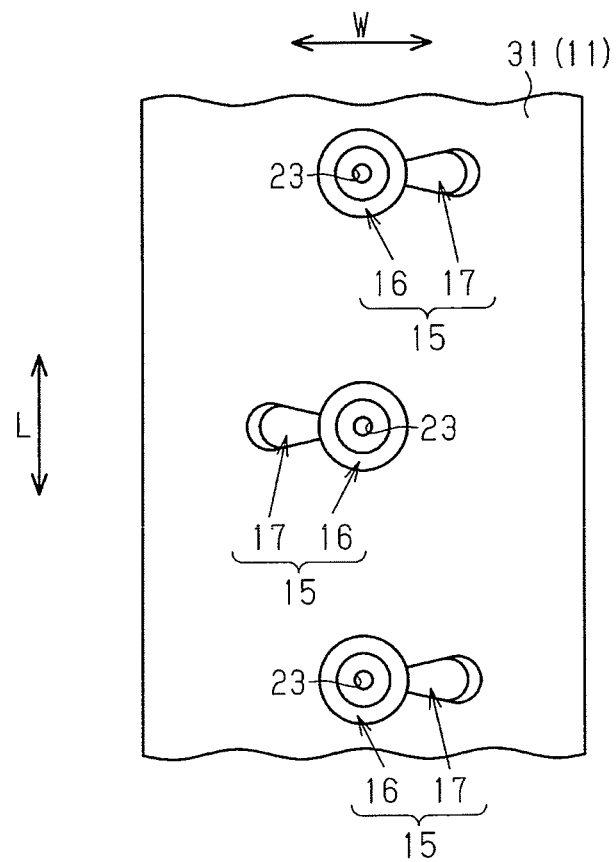
FIG. 7 is a front view showing a die of another modification as viewed from below.

As shown in FIG. 7, the discharge ports 23 may be aligned in a row. Also in this case, as shown in FIG. 7, for example, each blowing port 15 may be configured in any suitable manner as long as the blowing port 15 has the annular main portion 16 and the guide portion 17 continuous with the outer peripheral edge of the main portion 16.

Figure 8:
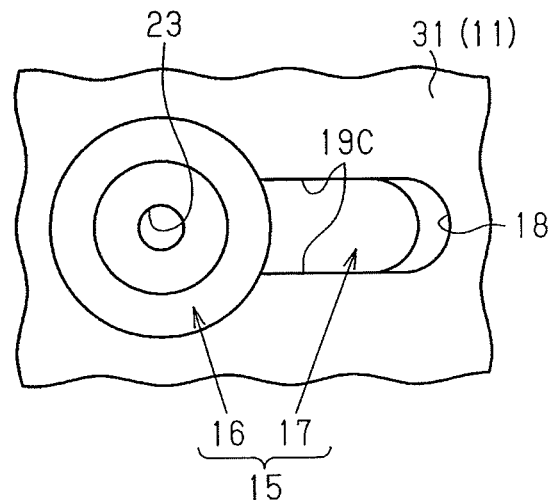
FIG. 8 is an enlarged front view showing a discharge port and a blowing port of another modification.

As shown in FIG. 8, the connecting portion between the main portion 16 and the guide portion 17 of each blowing port 15 may be formed without being constricted. For example, the inner peripheral edge of the guide portion 17 may have the arcuate portion 18 and two parallel portions 19C, which are arranged between the arcuate portion 18 and the main portion 16 and spaced apart by a uniform distance.

Figure 9:
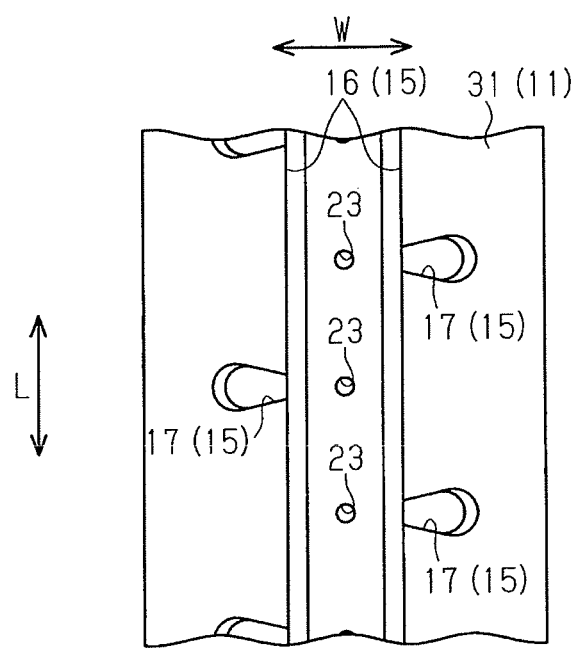
FIG. 9 is a front view showing a die of another modification as viewed from below.
Figure 10:
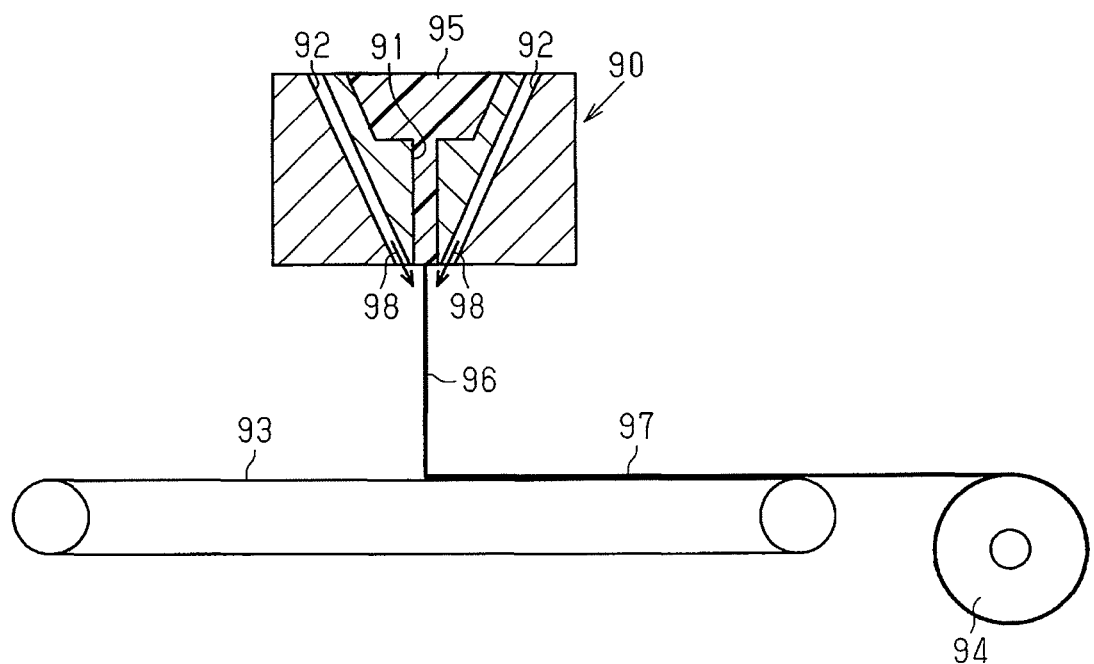
FIG. 10 is a cross-sectional view schematically showing a conventional device for manufacturing nonwoven fabric using a melt-blowing method.
Figure 11:
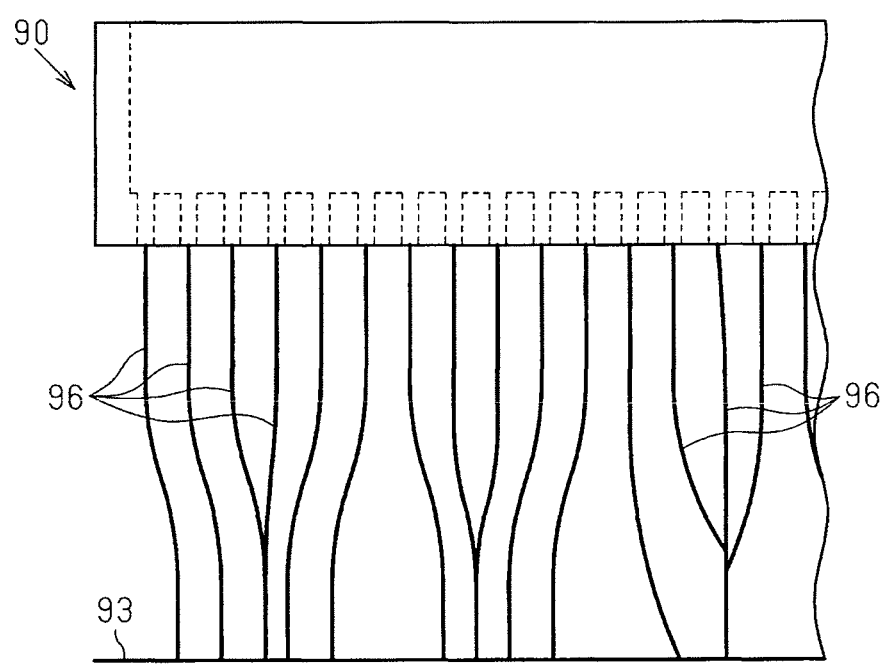
FIG. 11 is a front view showing a state of fusion of fibers spun by a conventional die.

The main portion of each blowing port does not necessarily have to have an annular shape. For example, as shown in FIG. 9, the discharge ports 23 may be aligned in a single row and two slit-like main portions 16 may be formed to extend in the longitudinal direction L on the opposite sides of the row of the discharge ports 23. In this case, each of the guide portions 17 corresponding to the respective discharge ports 23 must be continuous with the corresponding one of the main portions 16 and be formed to project away from the center of the corresponding discharge port 23, which is, for example, an outward direction in the width direction W.

In the above-illustrated embodiment, the two guide portions 17A, 17B (the first and second guide portions) corresponding to adjacent and closest two of the discharge ports 23 (the first and second proximate discharge ports) project in the opposite directions. However, the guide portions 17A, 17B (the first and second guide portions) do not necessarily have to project in the opposite directions by 180 degrees. In other words, the guide portions 17A, 17B (the first and second guide portions) may be configured in any suitable manner as long as the guide portions 17A, 17B are formed such that the hot air flow 82 guided by the guide portion 17A (the first guide portion) and the hot air flow 82 guided by the guide portion 17B (the second guide portion) flow to be separated away from each other as the distance from the opening surface 11 increases.

In the above-illustrated embodiment and modifications, the guide portions 17A, 17B (the first and second guide portions) or the two guide portions 17 (the first and second guide portions) are formed in correspondence with adjacent and closest two of the discharge ports 23 (the first and second proximate discharge ports). However, for example, one of the two guide portions 17A, 17B (the first and second guide portions) corresponding to the aforementioned two discharge ports 23 (the first and second proximate discharge ports) may be omitted. Alternatively, one of the two guide portions 17 (the first and second guide portions) corresponding to the two discharge ports 23 may be omitted. For example, in the example shown in FIG. 2, the guide portions 17B (the second guide portions) may be omitted. Also in this case, as the distance from the opening surface 11 increases, the hot air flow guided by each guide portion 17A (each first guide portion) flows to be separated away from the hot air flow blown onto the molten plastic 70 through the main portion 16B of the blowing port 15B, which lacks the guide portion 17B.

In the above-illustrated embodiment, the die 10 is arranged such that each discharge port 23 faces vertically downward, or the molten plastic 70 is discharged downward. However, the die 10 may be arranged such that the molten plastic 70 is discharged diagonally downward vertically or horizontally.

The invention claimed is:

1. A spinning die for melt-blowing employed in a device for manufacturing a nonwoven fabric using a melt-blowing method, the die comprising:
    a plurality of plastic passages;
    a hot air passage; and
    an opening surface in which a plurality of discharge ports and a plurality of blowing ports open, wherein each of the discharge ports discharges molten plastic supplied through a corresponding one of the plastic passages, and each of the blowing ports is arranged in correspondence with one of the discharge ports and blows hot air flow supplied through the hot air passage, wherein
    the die spins the molten plastic discharged from the discharge ports by blowing the hot air flow blown from the blowing ports onto the molten plastic,
    each of the blowing ports includes a main portion,
    adjacent and closest two of the discharge ports are first and second proximate discharge ports,
    one of the blowing ports that corresponds to the first proximate discharge port is a first proximate blowing port,
    one of the blowing ports that corresponds to the second proximate discharge port is a second proximate blowing port,
    the first proximate blowing port includes a guide portion that is continuous with the main portion of the first proximate blowing port and projects away from a center of the first proximate discharge port to guide the hot air flow in a projecting direction of the guide portion, and
    the guide portion is formed such that, as a distance from the opening surface increases, the hot air flow guided by the guide portion flows to be separated away from the hot air flow blown onto the molten plastic, which is discharged from the second proximate discharge port, through the main portion of the second proximate blowing port.

2. The spinning die for melt-blowing according to claim 1, wherein a connecting portion between the main portion and the guide portion of the first proximate blowing port is constricted.

3. The spinning die for melt-blowing according to claim 1, wherein in each of the blowing ports, the main portion has an annular shape concentric with the discharge port corresponding to the blowing port, and the guide portion is formed to be continuous with an outer peripheral edge of the main portion of the first proximate blowing port.

4. The spinning die for melt-blowing according to claim 1, wherein the guide portion of the first proximate blowing port is a first guide portion, the second proximate blowing port includes a second guide portion, the second guide portion is continuous with the main portion of the second proximate blowing port and projects away from a center of the second proximate discharge port to guide the hot air flow in a projecting direction of the second guide portion, and the first guide portion and the second guide portion are formed such that, as the distance from the opening surface increases, the hot air flow guided by the first guide portion and the hot air flow guided by the second guide portion flow to be separated away from each other.

5. The spinning die for melt-blowing according to claim 4, wherein the first guide portion of the first proximate blowing port and the second guide portion of the second proximate blowing port project in opposite directions.

6. The spinning die for melt-blowing according to claim 1, wherein the discharge ports are formed alternately on a first imaginary line and a second imaginary line that extend parallel to each other.

7. The spinning die for melt-blowing according to claim 4, wherein the discharge ports are formed alternately on a first imaginary line and a second imaginary line that extend parallel to each other.

8. The spinning die for melt-blowing according to claim 7, further comprising a nozzle member and a lip member, that are opposed to each other, wherein the plastic passages and the discharge ports are formed in the nozzle member, first and second inclined passages and a plurality of tubular passages are formed between the nozzle member and the lip member, the first and second inclined passages are inclined to approach each other toward the discharge ports in extending directions of the plastic passages, each of the tubular passages is continuous with the main portion of the corresponding one of the blowing ports, the first and second inclined passages are common to the blowing ports of the hot air passage, a first guide groove, which allows communication between the first inclined passage and the first guide portion of the first proximate blowing port, is formed in an inner peripheral surface of the lip member that forms one of the tubular passages continuous with the main portion of the first proximate blowing port, and a second guide groove, which allows communication between the second inclined passage and the second guide portion of the second proximate blowing port, is formed in an inner peripheral surface of the lip member that forms one of the tubular passages continuous with the main portion of the second proximate blowing port.

9. The spinning die for melt-blowing according to claim 8, wherein the nozzle member includes
a first outer side surface, which forms the first inclined passage,
a second outer side surface, which forms the second inclined passage,
a flat portion, which is continuous with the first and second outer side surfaces, and
a plurality of discharge portions, wherein each of the discharge portions has one of the discharge ports and projects from the flat portion toward the discharge port, and the nozzle member includes
a first guide recess, which is formed to span the first outer side surface and the flat portion and guides the hot air flow supplied from the first inclined passage toward the second guide portion of the second proximate blowing port, and
a second guide recess, which is formed to span the second outer side surface and the flat portion and guides the hot air flow supplied from the second inclined passage toward the first guide portion of the first proximate blowing port.

* * * * *